United States Patent
Alaqeeli et al.

(10) Patent No.: US 9,720,901 B2
(45) Date of Patent: Aug. 1, 2017

(54) AUTOMATED TEXT-EVALUATION OF USER GENERATED TEXT

(71) Applicant: King Abdulaziz City for Science and Technology, Riyadh (SA)

(72) Inventors: Abdulqadir A. Alaqeeli, Riyadh (SA);
Ibrahim Almosallam, Riyadh (SA);
Sakhar B. Alkhereyf, Riyadh (SA);
Suliman Alsowelim, Riyadh (SA)

(73) Assignee: KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 0 days.

(21) Appl. No.: 14/945,470

(22) Filed: Nov. 19, 2015

(65) Prior Publication Data

US 2017/0147682 A1    May 25, 2017

(51) Int. Cl.
*G06F 17/27* (2006.01)
*G06F 17/30* (2006.01)
(Continued)

(52) U.S. Cl.
CPC ........ *G06F 17/274* (2013.01); *G06F 17/2211* (2013.01); *G06F 17/2735* (2013.01); *G06F 17/30684* (2013.01); *G06N 3/08* (2013.01)

(58) Field of Classification Search
CPC .............................. G06F 17/274; G06F 17/28
(Continued)

(56) References Cited

U.S. PATENT DOCUMENTS 5,796,948 A * 8/1998 Cohen .................. G06Q 10/107
  709/202
6,029,195 A * 2/2000 Herz ................. G06F 17/30867
  348/E7.056

(Continued)

FOREIGN PATENT DOCUMENTS

WO    WO2008124385    10/2008

OTHER PUBLICATIONS

Inoue et al.,"Data Collection for Evaluating Automatic Filtering of Hazardous WWW Information"., KDD R&D Laboratories, Inc., Saitama JP., 1999 IEEE.

(Continued)

*Primary Examiner* — Shaun Roberts
(74) *Attorney, Agent, or Firm* — Andrew M. Calderon; Roberts Mlotkowski Safran Cole & Calderon, P.C.

(57) ABSTRACT

A method for an automated text-evaluation service, and more particularly a method and apparatus for automatically evaluating text and returning a score which represents a degree of inappropriate language. The method is implemented in a computer infrastructure having computer executable code tangibly embodied in a computer readable storage medium having programming instructions. The programming instructions are configured to: receive an input text which comprises an unstructured message at a first computing device; process the input text according to a string-structure similarity measure which compares each word of the input text to a predefined dictionary to indicate whether there is similarity in meaning, and generate an evaluation score for each word of the input text and send the evaluation score to another computing device. The evaluation score for each input message is based on the string-structure similarity measure between each word of the input text and the predefined dictionary.

20 Claims, 5 Drawing Sheets

(51) Int. Cl.
*G06F 17/22* (2006.01)
*G06N 3/08* (2006.01)

(58) Field of Classification Search
USPC .............................................................. 704/9
See application file for complete search history.

(56) References Cited

U.S. PATENT DOCUMENTS

| | | | | |
|---|---|---|---|---|
| 6,389,472 | B1* | 5/2002 | Hughes | H04L 12/1818 348/E7.071 |
| 6,424,935 | B1* | 7/2002 | Taylor | G10L 15/005 704/10 |
| 6,782,510 | B1* | 8/2004 | Gross | G06F 17/274 704/10 |
| 7,437,290 | B2* | 10/2008 | Danieli | G10L 15/08 704/251 |
| 7,653,621 | B2* | 1/2010 | Senthil | G06F 17/2211 706/48 |
| 8,176,055 | B1* | 5/2012 | Datar | G06Q 10/10 707/749 |
| 8,190,621 | B2 | 5/2012 | Ryu | |
| 8,843,453 | B2* | 9/2014 | Koren | G06F 17/273 707/690 |
| 9,405,741 | B1* | 8/2016 | Schaaf | G10L 15/08 |
| 9,454,519 | B1* | 9/2016 | Keysers | G06F 17/241 |
| 2002/0007371 | A1* | 1/2002 | Bray | H04N 5/44513 715/205 |
| 2002/0116629 | A1 | 8/2002 | Bantz et al. | |
| 2004/0177081 | A1 | 9/2004 | Dresden | |
| 2008/0059211 | A1 | 3/2008 | Brock et al. | |
| 2008/0134282 | A1* | 6/2008 | Fridman | G06Q 10/10 726/1 |
| 2008/0162540 | A1* | 7/2008 | Parikh | G06F 17/30867 |
| 2008/0201411 | A1 | 8/2008 | Paritosh | |
| 2010/0268682 | A1* | 10/2010 | Lewis | G06Q 10/107 706/54 |
| 2011/0106801 | A1* | 5/2011 | Srivastava | G06Q 10/10 707/737 |
| 2011/0191097 | A1* | 8/2011 | Spears | G06F 17/28 704/9 |
| 2014/0067738 | A1* | 3/2014 | Kingsbury | G06N 3/08 706/20 |
| 2014/0316784 | A1* | 10/2014 | Bradford | G10L 15/18 704/245 |
| 2015/0112753 | A1* | 4/2015 | Suvarna | G06Q 50/01 705/7.29 |
| 2016/0224540 | A1* | 8/2016 | Stewart | G06F 17/273 |

OTHER PUBLICATIONS

Graesser et al., "Methods of Automated Text Analysis", University of Memphis, Memphis, TN, Jun. 2014, 42pp.

* cited by examiner

AUTOMATED TEXT-EVALUATION OF USER GENERATED TEXT

FIELD OF THE INVENTION

The invention relates to a method for an automated text-evaluation service, and more particularly to a method and apparatus for automatically evaluating text and returning a score which represents a degree of inappropriate language.

BACKGROUND OF THE INVENTION

User generated content has become ubiquitous and occupies a major portion of media content. For example, news portals, television stations, etc., allow people to interact with articles and live programs through user generated content. Further, online stores allow customers to write reviews on their products, and social media allows another avenue for users to quickly post user generated content.

However, in all these different forms of media, there is a continuous and large demand to filter inappropriate language. Usually, these forms of media rely on simple black list filtering and manual human evaluation. However, relying on manual human evaluation is very slow and is not able to keep up with live commenting (i.e., live chats on television). Moreover, even when dealing with a single language (e.g., Arabic), blacklisting and manual filtration is not very effective due to the different dialects and ways in which a word is pronounced or written throughout different countries. Further, in some of these languages (e.g., Arabic), there is no working dictionary for the informal language and no current methodology to map words and phrases to a unified dialect.

SUMMARY OF THE INVENTION

In a first aspect of the invention, a method is implemented in a computer infrastructure having computer executable code tangibly embodied in a computer readable storage medium having programming instructions. The programming instructions are further configured to receive an input text which comprises an unstructured message at a first computing device. The method further includes processing the input text according to a string-structure similarity measure which compares each word of the input text to a predefined dictionary to indicate whether there is similarity in meaning, and generating an evaluation score for each word of the input text at the first computing device and sending the evaluation score to another computing device. In the method, the evaluation score for each word of the input text is based on the string-structure similarity measure between each word of the input text and the predefined dictionary.

In another aspect of the invention, a computer system for training an artificial neural network (ANN) includes a CPU, a computer readable memory, and a computer readable storage media. The system further includes program instructions to: collect a plurality of text inputs which comprises a plurality of dialects which correspond to at least one language, and store the plurality of text inputs in a database of the computing system; categorize each word in the plurality of text inputs as a good message or a bad message based on a vectorized form of the input message by comparing each word in the input message to a predetermined dictionary; train an artificial neural network (ANN) based on the vectorized form of the input message in the database and its corresponding category; and determine inappropriate language in another text using the trained ANN and a string-structure similarity measure. The program instructions are stored on the computer readable storage media for execution by the CPU via the computer readable memory.

In yet another aspect of the invention, a computer system for reducing a size of a dictionary includes a CPU, a computer readable memory, and a computer readable storage media. The system further includes program instructions to analyze a dictionary comprising a plurality of words from at least one of websites, portals, and social media; calculate a score for each word of the plurality of words in the dictionary that are labeled in a bad message category; and reduce the size of the dictionary by selecting each word of the plurality of words which has a ranking equal to or above a predetermined threshold. The program instructions are stored on the computer readable storage media for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

Figure 1:
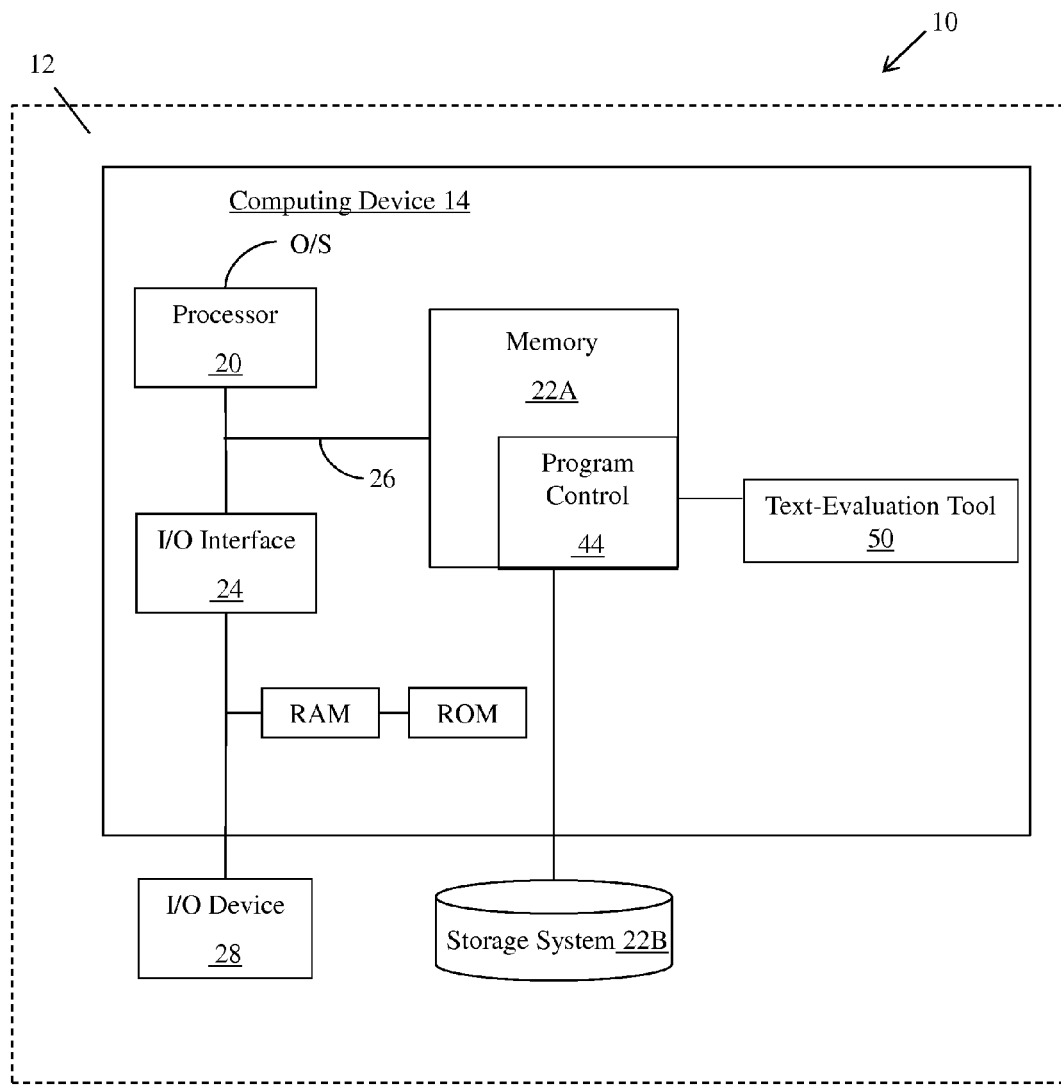
FIG. 1 shows an illustrative environment for managing the processes in accordance with aspects of the present invention.

The invention relates to a method for an automated text-evaluation service, and more particularly to a method and apparatus for automatically evaluating text and returning a score which represents a degree of inappropriate language. More specifically, embodiments of the invention relate to an automated text-evaluation service which is built using machine-learning methods and delivered via web-service technologies. Particularly advantageously, the processes and systems described herein can identify inappropriate language (e.g., words, phrases, etc.) in one dialect of a language which would not necessarily be an inappropriate word or phrase in another dialect of the same language (e.g., Arabic). The processes and systems described herein can also identify inappropriate language in multi-lingual text.

In embodiments of the invention, a request for a text-evaluation service may be electronically sent to a server so that the text can be evaluated for inappropriate language. In response, the text-evaluation service can respond to the request with an evaluation score of the message. In embodiments, the evaluation score will provide an indication of whether the text, structured or unstructured, has inappropriate language. In embodiments, the text-evaluation service may be automated, and an evaluation time can be reduced.

In embodiments, the text-evaluation service will significantly decrease the number of texts or other types of messages for review, by providing only a limited number of messages with scores above a predetermined threshold. The predetermined threshold may be set by the end user of the text-evaluation service.

In embodiments of the invention, the processes and systems described herein will provide evaluation services and identify inappropriate text within a same language but different dialects, intentional misspellings, etc. The processes and systems described herein are thus an improvement over known methods and systems which use traditional blacklists and which do not take into consideration different dialects of a same language, or which would otherwise have difficulty identifying inappropriate language of unstructured text. For example, if an inappropriate word is misspelled, known methods and systems would allow the misspelled inappropriate word to pass a blacklist filter. In contrast, the processes and systems described herein will be able to flag the misspelled inappropriate word even though it is not an exact text match to predefined inappropriate words. In another example, even though a word or phrase may be appropriate for a particular dialect, this same word or phrase may be inappropriate within certain context of a different dialect of the same language; however, advantageously, the processes and systems described herein will be able to also flag an inappropriate word even though the word may have different meanings across different dialects in a same language (e.g., Arabic).

In embodiments of the invention, processes and systems of the text-evaluation service will be implemented as an Artificial Neural Network (ANN) model. The ANN model is trained on using a manually labeled dataset which is collected from different sources (e.g., the Internet) and labeled by evaluators based on a profanity level. In this way, the processes and systems focus on highly noisy and unstructured short text messages to detect messages that have an unacceptable level of profanity, which can be advantageously implemented using different language dialects. The processes and systems maximize an accuracy of detection across a varied range of acceptability thresholds that can be set by the end user of the text-evaluation service.

In embodiments, the text-evaluation service replaces a strict "exact" text matching (i.e., a blacklist) in a bag-of-words representation with a string similarity measure. Thus, in the embodiments, if two words have a close string text structure, then they should share a similar meaning and/or semantic. In some root-based languages (e.g., Arabic), the text-evaluation service of the processes and systems are very useful since the root-based languages have indexes in addition to the well known suffixes and prefixes. In this way, it is now possible to identify inappropriate language amongst different dialects of a single language (e.g., Arabic), while still being able to reduce the evaluation time for identifying the inappropriate language.

In order to overcome some of the issues present in strict "exact" text matching (i.e., a blacklist) in a bag-of-words representation, known methods and systems have used stemming. However, stemming is not an ideal solution because in highly noisy and unstructured short text messages, messages do not conform to pre-established language rules or grammar because of the short length and informality of text messages. Therefore, the embodiments of the invention use string similarity to deal with different language dialects, highly noisy, and unstructured short text.

System Environment

Although the systems and methods described hereafter with regard to exemplary methods, and/or computer program products, it should be understood that other implementations are also contemplated by the present invention as described herein. For example, other devices, systems, appliances, and/or computer program products according to embodiments of the invention will be or become apparent to one of ordinary skill in the art upon review of the following drawings and detailed description. It is intended that all such additional other devices, systems, appliances, processes, and/or computer program products be included within this description and within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, any non-transitory storage medium, device, or system including an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se.

Computer readable program instructions described herein can be downloaded to respective computing/processing devices from a computer readable storage medium or to an external computer or external storage device via a network, for example, the Internet, a local area network, a wide area network and/or a wireless network.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

FIG. 1 shows an illustrative environment 10 for managing the processes in accordance with the invention. The environment 10 includes a server or other computing system 12 that can perform the processes described herein. The server 12 includes a computing device 14 which can be resident on a network infrastructure or computing device. The computing device 14 includes a processor 20, memory 22A, an I/O interface 24, and a bus 26. In addition, the computing device includes random access memory (RAM), a read-only memory (ROM), and an operating system (O/S).

The computing device 14 is in communication with the external I/O device/resource 28 and the storage system 22B. The I/O device 28 can comprise any device that enables an individual to interact with the computing device 14 (e.g., user interface) or any device that enables the computing device 14 to communicate with one or more other computing devices using any type of communications link.

The processor 20 executes computer program code (e.g., program control 44), which can be stored in the memory 22A and/or storage system 22B. While executing the computer program code, the processor 20 can read and/or write data to/from memory 22A, storage system 22B, and/or I/O interface 24. The program code executes the processes of the invention. The bus 26 provides a communications link between each of the components in computing device 14.

By way of example, a text-evaluation tool 50 may be configured to receive an input text and return a score which represents a degree of an inappropriate language. In the embodiments, the text-evaluation tool 50 may be built using machine-learning methods and delivered via web-service technologies using an application programming interface (API). In embodiments, the text-evaluation tool 50 may be included in a server (e.g., server 12) and the text-evaluation tool 50 may receives a request and a message for a text-evaluation service (e.g., the request may be received from a provider of television programming, blogs, social media, websites, etc.) In response to the request and the message for the text-evaluation service, the text-evaluation tool 50 included in the server may return a score via a service provider which represents the degree of inappropriate language. The score provided by the text-evaluation tool 50 included may be provided as a service to other sites, such as television programming, blogs, social media, websites, etc. In contrast to known methods and systems, which use an "exact" text matching (i.e., blacklists), the text-evaluation tool 50 uses a string similarity measure in order to evaluate the degree of inappropriate language.

In particular, the text-evaluation tool 50 can represent a degree of inappropriate language based on a set of continuous values from 0 to 1 (i.e., 0 having no similarity or total mismatch and 1 corresponding to an exact match). As the text-evaluation tool 50 returns a score which can range from 0 to 1, an end user may set a predetermined threshold for filtering the inappropriate language.

In an alternative embodiment, the text-evaluation tool 50 may cover other classification schemes, such as opinion-related classification (e.g., "sentiment") and may predict a number of likes or comments on an article based on the opinion-related classification. Further, the text-evaluation tool 50 may be used in a multi-classification scheme.

Flow Diagram

FIGS. 2-5 show flow diagrams implementing aspects of the present invention. Each of the flow diagrams may equally represent a high-level block diagram or a swim-lane diagram of the invention. The steps of the flow diagram may be implemented and executed from either a server, in a client server relationship, or they may run on a user workstation with operative information conveyed to the user workstation as represented in FIG. 1. Furthermore, the invention can take the form of a computer program product accessible from the computer-readable storage medium providing program code for use by or in connection with a computer or any instruction execution system. The software and/or computer program product can be implemented in the environment of FIG. 1.

In embodiments, messages (e.g., comments and/or input texts) may be converted into fixed-size vectors using a bag-of-words technique. In the bag-of-words technique, a dictionary is the list of unique words that appear in the training set. Then, there are several ways to populate a message-dictionary matrix. For example, populating the message-dictionary matrix can be done by binary values (i.e., 1 if the word appears and 0 if the word does not appear), the number of occurrences in a message, or frequencies of the message (i.e., counts normalized by the length of the messages).

Figure 2:
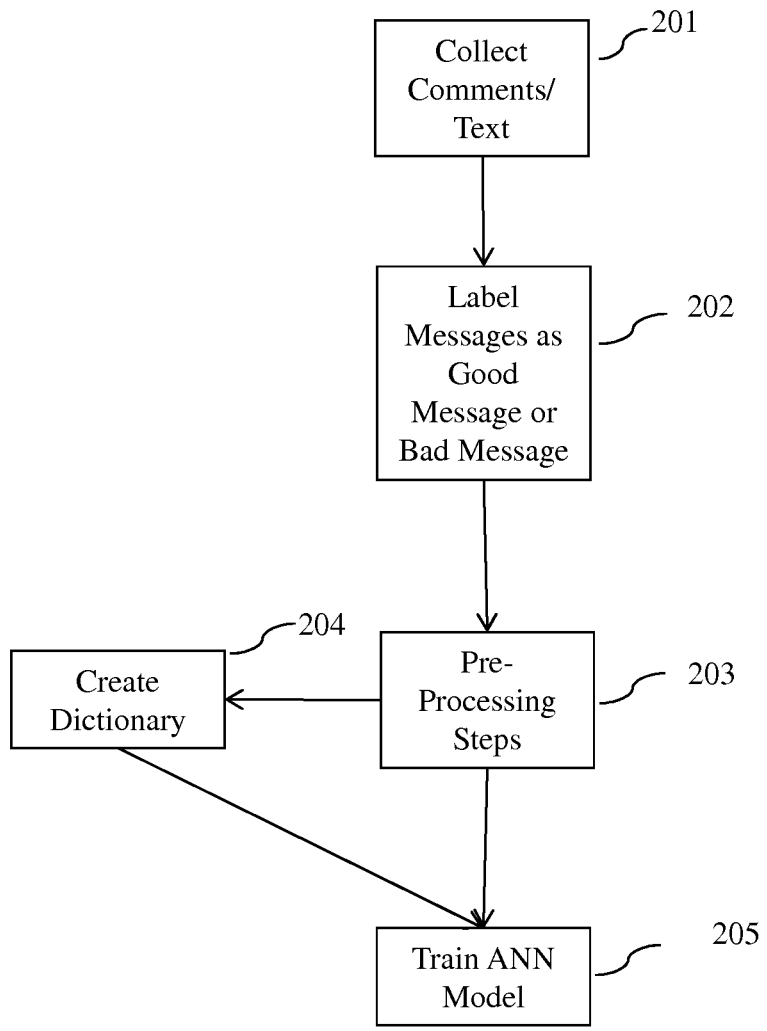
FIG. 2 shows a flow diagram of training an Artificial Neural Network (ANN) in accordance with aspects of the present invention.

FIG. 2 shows a flow diagram of training an Artificial Neural Network (ANN) in accordance with aspects of the present invention. At step 201, comments and/or text inputs are collected in a database of a first computing device. In embodiments, the comments and/or text inputs may be collected at the first computing device using an application programming interface (API) of a web service technology. The API is a programming interface, as opposed to a user interface, to allow for a wide adaptation of the system to be used in multiple user interfaces based on the user's need. As an example, a web crawler may be used to collect the comments and/or the text inputs from websites, portals, social media, etc. The web crawler may collect the comments and/or the text inputs based on the specified language (e.g., Arabic). Further, the crawler may be entirely a hardware device, entirely a software embodiment (e.g., firmware, resident software, micro-code, etc.), or an embodiment combining software and hardware aspects that may all generally be referred to as a "circuit", "module", or "system". The comments and/or the text inputs based on the specified language may be highly unstructured and noisy.

The Artificial Neural Network (ANN) of the embodiments may receive and output data in a similar manner as a Support Vector Machine (SVM), using APIs as an example. Both the ANN and SVM construct a mapping from input x to output y. In a classification scheme, x is a set of features and y is the desired output. In embodiments, the input to the ANN may be a vectorized form of the message. Further, the ANN may be entirely a hardware device, entirely a software embodiment (e.g., firmware, resident software, micro-code, etc.), or an embodiment combining software and hardware aspects that may all generally be referred to as a "circuit", "module", or "system".

At step 202, participants with expertise and/or knowledge of different dialects of a language, e.g., Arabic, label the comments and/or the input texts based on whether the messages contain obscene language. In particular, participants label the messages as a "good message" or a "bad message" based on the language and not the sentiment. In an embodiment, the participants may label the messages which do not adhere to language rules due to length limitations or to avoid being censored. For example, techniques of the present invention can overcome the shortcomings of known methods which cannot account for length limitation including abbreviating words, replacing a word with one letter that sounds like the word, concatenating words to avoid writing the space character, etc. Further, in another example, techniques of the present invention can overcome the shortcomings of known methods which cannot account for words trying to avoid being censored including intentionally misspelling a word, replacing a letter with a similar looking symbol, introducing spaces in between words, etc. Thus, labeling messages as a "good message" or a "bad message" allows for flexibility in the ANN by incorporating and labeling messages which are not an "exact" obscene language match, within a dialect.

At step 203, pre-processing steps can be used to reduce the amount of noise in the comments and/or the text inputs after the messages are labeled as good messages and bad messages. These pre-processing steps are used in order to counteract the most common noise in the comments and/or the text input. For example, for a specified language (i.e., Arabic), pre-processing steps may include any combination of removing diacritics, replacing any إ or أ with ا, replacing any ة with ه, separating symbols from words, i.e., ( امحمد ) with ( امحمد ), removing repeated characters (more than 2), i.e., ( ميروووه! ) with ( ميروه! ), and replacing all numbers with <N> symbol. It should be understood by those of skill in the art that training the ANN may perform any pre-processing steps including none of the process steps of step 203.

At step 204, a dictionary with words is created from the collected comments and/or text inputs and their corresponding label (e.g., "good message" or "bad message"). Further, step 204 may be accomplished after the pre-processing steps (e.g., step 203) are completed. If the dictionary is already created, at step 204, additional collected comments and/or text inputs and their corresponding label may be added to the dictionary. Further, in a scenario in which the collected comments and/or text inputs are already found in the dictionary, step 204 may be skipped and the flow may go to step 205.

At step 205, labeling of the messages as a "good message" and a "bad message" is used to train an ANN model to predict future inappropriate messages. ANNs are statistical models that are trained to maximize the probability of the class label given the input message. As for any statistical models, the models become more accurate and the effect of noise is reduced with more data. The complexity of the algorithm can be increased by increasing the number of hidden units, or neurons, to better fit the data. However, the model can be over-complex to fit the data, which is determined by monitoring the performance of the algorithm on an unseen data. The optimal number of hidden units is determined by selecting the model that best performs on a held-out test set. In an example of step 205, the training of the ANN model of the first computing device to predict future inappropriate messages uses at least one of string-similarity measures described in FIG. 3. Further, the training of the ANN model may incorporate different dialects of a single language (e.g., Arabic) so that the ANN model can be trained to account for different pronunciations across different regions of the world. In embodiments, the training of the ANN model may occur through a web based service. Moreover, the determination of whether a message is a good message or a bad message may be provided to the end user, e.g., television programming, blogs, social media, websites, through a web based service.

Figure 3:
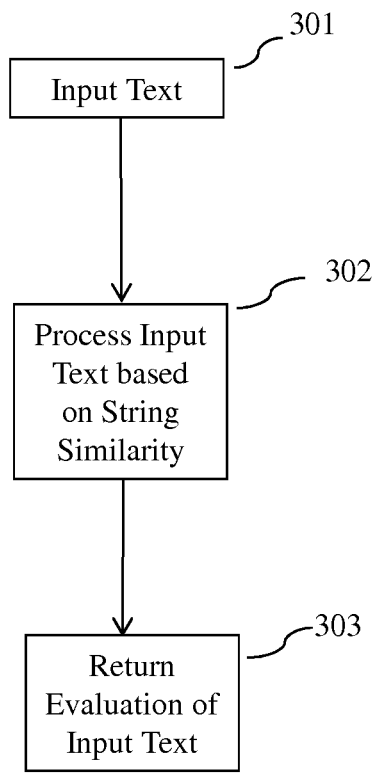
FIG. 3 shows a flow diagram of an example of a text-evaluation service in accordance with aspects of the present invention.

FIG. 3 shows a flow diagram of an example of a text-evaluation service in accordance with aspects of the present invention. In particular, the text-evaluation service may be incorporated in the text-evaluation tool 50 of FIG. 1. At step 301, a text may be input. In an example, the text may be a highly noisy and unstructured short text message. However, embodiments are not limited, and the text can be any type of message.

At step 302, the input text is processed based on a string similarity measure. In the embodiments, the string similarity measure uses string-structure similarity between words as an indication of similarity in meaning. Therefore, sentence vectorization methods of short-text classification (i.e., bag-of-words) are modified to account for string similarity. Thus, instead of comparing text strings in a binary fashion, string similarity matching algorithms are implemented by the processes and systems herein are adopted in order to output a similarity score with a value ranging from 0 to 1 (i.e., 0 corresponds to a total mismatch and 1 corresponds to an exact match).

String similarity matching algorithms that are implemented in the processes and systems herein be used in the embodiments include Jaro and Jaro-Winkler methods. For example, in both Jaro and Jaro-Winkler two text strings are taken as an input and output a value ranging from 0 to 1 (i.e., 0 corresponds to a total mismatch and 1 corresponds to an exact match). In this way, Jaro and Jaro-Winkler are measures of similarity between two strings. The following equation is used to calculate a Jaro distance dj between two given strings s1 and s2.

$$dj = \{0 \text{ when } m=0, \text{ otherwise } \tfrac{1}{3}(m/|s1|+m/|s2|+(m-t)/m)\}, \quad \text{(Equation 1)}$$

wherein m is the number of matching characters and t is half the number of transpositions.

Two characters s1 and s2 are considered to be matched if they are not farther than the following equation. Also, s1 and s2 are matched if less than or equal to $$(\max(s1,s2)/2)-1. \quad \text{(Equation 2)}$$

The following equation is used to calculate the Jaro-Winkler distance (dw) between two given strings s1 and s2.

$$dw = dj + (lp(1-dj)), \quad \text{(Equation 3)}$$

wherein dj is the Jaro distance between two given strings s1 and s2, l is the length of a common prefix as the start of the string up to a maximum of 4 characters, p is a constant scaling factor for how much the score is adjusted upwards for having common prefixes: p should not exceed 0.25, otherwise the distance can become larger than 1. As an example, the standard value for this constant in Winkler's research is 0.1.

Although Jaro and Jaro-Winkler are examples of string similarity matching algorithms described herein, the processes and systems described herein are not limited to these examples. Accordingly, embodiments may include any string similarity matching algorithm that is within the knowledge of one of ordinary skill in the art and suitable to produce a continuous range of values which correspond to a similarity between two words.

Finally, at step 303, the text-evaluation service returns an evaluation of the input text to the end user. In embodiments, the text-evaluation service may be instantiated to perform its analysis, and then return an evaluation of the input text to another computing device requesting the evaluation through the use of APIs of a web service technology. In an example, the text-evaluation service may request an evaluation score from a computing system which will evaluate the text and provide a score to another computing device requesting the evaluation. The score is the algorithm's confidence which can range from 0 to 1 (i.e., 0 corresponds to a totally appropriate message and 1 corresponds to a totally inappropriate message). In another example, if a predetermined threshold for offensive (i.e., inappropriate) language is set by the end user, the text-evaluation service may return a "yes" or "no" based on whether the evaluation score is above the predetermined threshold.

In known systems and methods, a dictionary size will be large given the nature of the data set (e.g., websites, portals, social media, etc.) Having a large dictionary will increase a time and space complexity of the text-evaluation service. Further, in a root-based language (e.g., Arabic), the number of possibility words in the dictionary increases. Taking this into consideration, the processes and systems described herein reduce the size of a dictionary in order to reduce the time and space complexity of the text-evaluation service.

Figure 4:
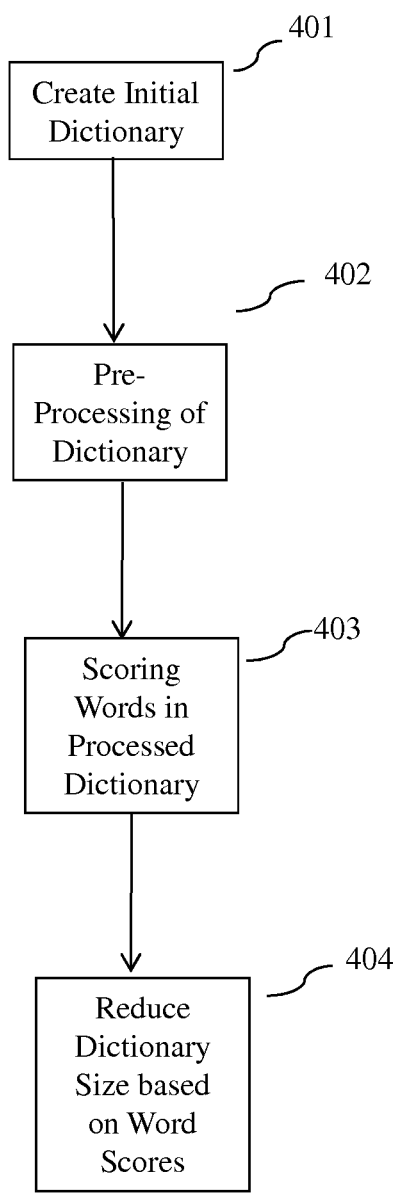
FIG. 4 shows a flow diagram for reducing the size of a dictionary in order to reduce the time and space complexity of the text-evaluation service in accordance with aspects of the present invention.

FIG. 4 shows a flow diagram for reducing the size of a dictionary of a computing device in order to reduce the time and space complexity of the text-evaluation service. At step 401, a dictionary with words from at least one of the data set (e.g., websites, portals, social media, etc.) is input. Further, the dictionary comprising the plurality of words may be input at the computing device, which receives the plurality of words from at least one of websites, portals, and social media. In order to reduce some of the overhead (i.e., dictionary size) in the dictionary, pre-processing of the dictionary occurs at step 402. Pre-processing may include using spell checkers, removing stop words and punctuation marks, unifying numbers into one symbol, removing low frequency words, and removing neutral words based on the correlation between the messages where the word appears and the target label.

In order to reduce the dictionary size of the computing device further, the words in the dictionary are scored at step 403. The scoring of words in the dictionary allows for the dictionary size to be reduced and the dictionary to include the most informative words that correlate with the labels (e.g., "a good message" or "a bad message"). A scoring measure may be calculated for each word based on its frequency in each class label. For example, words that appear much more frequently in one label versus the other is assumed to be more informative. Further, words that have equal frequencies in both labels (e.g., "a good message" and "a bad message") are assumed to be neutral and do not contribute much information to the prediction process. The scoring of words is calculated based on the following equation:

$$\text{Score}(w) = \log(p+(w)/p-(w)), \quad \text{(Equation 4)},$$

wherein p+(w) is the probability that word w is a positive word and p−(w) is the probability that word w is a negative word.

Equation 4 will assign a positive value if the word appears more frequently in positive messages, a negative number if the word appears more in negative messages, and zero if it appears equally in all labels. This scoring measure is used to rank words based on their magnitude (absolute value). Then, at step 404, the top k words are selected to reduce the dictionary size based on the rank of the words. As an example, the k can be set to 5,000 words to decrease the time and space complexity of the text-evaluation service. It is worth mentioning that the probability of class label for each word is normalized so that we do not falsely assign a high probability for low frequency words, for example, a word that only appears once in an inappropriate message. This is done by removing low frequency words prior to calculating the probability.

Figure 5:
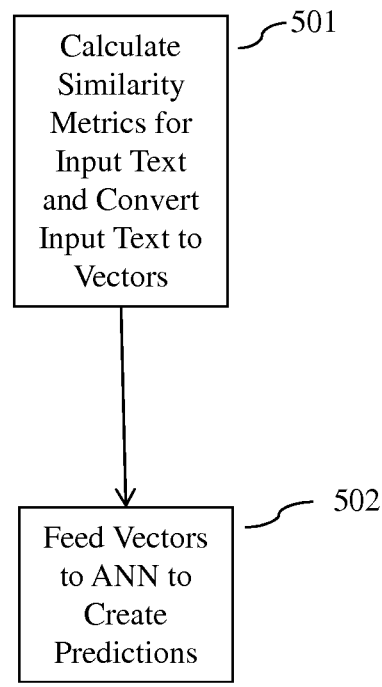
FIG. 5 shows a flow diagram for building a matrix in accordance with aspects of the invention.

FIG. 5 shows a flow diagram for building a matrix. In step 501, similarity metrics are calculated for an input text (e.g., a message). Further, the input text (e.g., the message) is converted into vectors. Then, a matrix is constructed based on the vectors such that each row is a message and each column is a word. The matrix may be populated using similarity metrics for each vector. There are several ways to populate the matrix, which may take into account string similarity. The matrix can be populated using a maximum method. In the maximum method, each element in row i (i.e., a message) and column j (i.e., a word) is populated by a maximum string similarity between the word and the words in the message. In this scenario, if the word appears in the message, the value will be 1. The maximum method is a generalization of the presence method, in which each element in row i (i.e., a message) and column j (i.e., a word) is populated by either 1, meaning the word j appeared in message i, or 0 otherwise.

The matrix can also be populated using a sum method. In the sum method, each element in row i (i.e., a message) and column j (i.e., a word) is populated by a sum of the total similarity between the word j and the words in message i. The sum method is a generalization of the counts method in which each element in row i (i.e., a message) and column j (i.e., a word) is populated by the number of occurrences of word j in message i.

The matrix can also be populated using an average method. In the average method, the value generated from the sum is divided by the length of the message. The average method is a generalization of the frequency method in which each element in row i (i.e., a message) and column j (i.e., a word) is populated by the number of frequencies of word j in message i, or the number of occurrences divided by the length of the message.

In the maximum, sum, and average methods, the processes and systems described herein incorporate a string similarity measure to enrich feature representation. Therefore, when constructing a matrix and comparing words, the comparison output between different words is no longer binary (i.e., match/mismatch), but instead has a continuous numeric value output between zero and one based on string similarity measures (e.g., Jaro or Jaro-Winkler). Further, the dimensionality of the matrix may be reduced using principal component analysis (PCA).

Further, in the embodiments, after the messages have been converted to vector representation, at step 502, the vector representation may be used to train the ANN model based on the supplied labels. In other words, the vector representation of the messages may be fed into the ANN in order to create predictions. The trained ANN model is used to predict further text messages after they have been converted to vectors in the same way as the training text (e.g., using string-structure similarity measures).

The foregoing examples have been provided for the purpose of explanation and should not be construed as limiting the present invention. While the present invention has been described with reference to an exemplary embodiment, changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed:

1. A method implemented in a computer infrastructure having computer executable code tangibly embodied in a computer readable storage medium having programming instructions configured to:
receive an input text which comprises an unstructured message in a first dialect and a second dialect of at least one language at a first computing device;
identify the unstructured message as inappropriate language in the first dialect and appropriate language in the second dialect of the at least one language;
process the input text according to a string-structure similarity measure which compares each word of the input text to a predefined dictionary to indicate whether there is a similarity in meaning; and
generate an evaluation score for each word of the input text at the first computing device and send the evaluation score to another computing device,
wherein the evaluation score for each word of the input text is based on the string-structure similarity measure between each word of the input text and the predefined dictionary, and
the evaluation score corresponds to a degree that the unstructured message of the input text comprises the inappropriate language in the first dialect with respect to the appropriate language in the second dialect of the at least one language.

2. The method of claim 1, wherein the unstructured message does not conform to pre-established language rules or grammar.

3. The method of claim 1, wherein the string-structure similarity measure comprises one of a Jaro similarity measure and a Jaro-Winkler similarity measure.

4. The method of claim 1, wherein the predefined dictionary comprises a plurality of words which have been determined to be informative words of a language in a message as it relates to a target label.

5. The method of claim 4, wherein each of the plurality of words have been determined to be the informative words of the language in the message based on a trained dataset and the target label.

6. The method of claim 4, wherein the plurality of words are collected from at least one of websites, portals, and social media.

7. The method of claim 1, wherein the evaluation score is a value from zero to one which corresponds to the degree that each input message of the input text comprises the inappropriate language in a message.

8. The method of claim 1, wherein the predefined dictionary comprises a plurality of dialects which correspond to the at least one language.

9. The method of claim 8, wherein the input text is multi-lingual.

10. The method of claim 1, wherein the processing the input text further comprises converting the input text to a vectorized form of the input text by comparing each word in the input text to the predefined dictionary using string similarity measures.

11. The method of claim 1, further comprising flagging each word of the input text in response to the evaluation score being above a predetermined threshold and sending the flag to the another computing device, and the input text is received at the first computing device using an application programming interface (API) of a web service technology.

12. A computer system for training an artificial neural network (ANN), the computing system comprising:
a CPU, a computer readable memory, and a computer readable storage media;
program instructions to collect a plurality of text inputs which comprises a plurality of dialects which correspond to at least one language, and store the plurality of text inputs in a database of the computing system;
program instructions to categorize each input message in the plurality of text inputs as a good message which does not include obscene language or a bad message which does include the obscene language based on a vectorized form of the input message by comparing each word in the input message to a predetermined dictionary; and
program instructions to train an artificial neural network (ANN) based on the vectorized form of the input message in the database and its corresponding category; and
program instructions to determine inappropriate language in another text using the trained ANN and a string-structure similarity measure, and
wherein the program instructions are stored on the computer readable storage media for execution by the CPU via the computer readable memory, and
the obscene language corresponds to a specific dialect.

13. The computer system of claim 12, wherein the plurality of text inputs are collected from at least one of websites, portals, and social media.

14. The computer system of claim 12, wherein each input message in the plurality of text inputs is categorized as the good message or the bad message in a specified dialect corresponding to the at least one language based on user input from a plurality of users.

15. The computer system of claim 12, wherein the plurality of text inputs comprises an unstructured message.

16. The computer system of claim 15, wherein the unstructured message does not conform to pre-established language rules or grammar.

17. A computer system for reducing a size of a dictionary, the system comprising:
a CPU, a computer readable memory, and a computer readable storage media;
program instructions to analyze a dictionary comprising a plurality of words from at least one of websites, portals, and social media;
program instructions to calculate a score for each word of the plurality of words in the dictionary that are labeled in a bad message category which corresponds with obscene language; and
program instructions to reduce the size of the dictionary by selecting each word of the plurality of words which has a ranking equal to or above a predetermined threshold,
wherein the program instructions are stored on the computer readable storage media for execution by the CPU via the computer readable memory, and
the score is calculated for each of the plurality of words by dividing a probability that each of the plurality of words is a positive word by a probability that each of the plurality of words is a negative word, and
the obscene language corresponds to a specific dialect.

18. The computer system of claim 17, further comprising program instructions to pre-process the dictionary comprising the plurality of words after calculating the score for each of the plurality of words in the dictionary, wherein the pre-processing the dictionary comprises at least one of using spell checkers, removing stop words, and punctuation marks, unifying numbers into one symbol, and removing low frequency words.

19. The computer system of claim 17, wherein the dictionary comprises a plurality of dialects which correspond to at least Arabic.

20. The computer system of claim 17, wherein the rank of the score is determined based on an absolute value of the score.

\* \* \* \* \*